ically disengageable rope receiver loop assembly means mounted upon said tether means intermediate said first and second opposite ends thereof, said disengageable rope receiver loop assembly means being capable of alternately receiving or releasing said first end of the rope means therethrough to permit disengagement of said rope means from said tether means whenever desired and without the need for disengaging either of said first or second opposite ends of said tether means from said supports.

United States Patent [19]
Meyer

[11] Patent Number: 4,834,027
[45] Date of Patent: May 30, 1989

[54] APPARATUS FOR RESTRAINING AN ANIMAL WITHIN A PRESELECTED AREA

[76] Inventor: Deane L. Meyer, 8550 LeBerthon St., Sunland, Calif. 91040

[21] Appl. No.: 159,312

[22] Filed: Feb. 23, 1988

[51] Int. Cl.⁴ ............................................. A01K 3/00
[52] U.S. Cl. ..................................... 119/120; 119/96
[58] Field of Search ............... 119/118, 119, 120, 109, 119/96; 54/34; 43/85, 86, 87

[56] References Cited

U.S. PATENT DOCUMENTS

| | | | |
|---|---|---|---|
| 503,497 | 8/1893 | Robbins et al. | 54/34 |
| 1,818,301 | 8/1931 | Canaday | 43/87 |
| 2,289,802 | 7/1942 | Norton | 119/109 |
| 2,878,981 | 3/1959 | Guido | 119/96 |
| 3,295,501 | 1/1967 | Riley | 119/96 |
| 3,426,559 | 2/1969 | Schubach et al. | 119/109 |
| 3,722,478 | 3/1973 | Smith | 119/120 |
| 4,252,084 | 2/1981 | Willow | 119/96 |
| 4,396,091 | 8/1983 | Anderson | 119/96 X |
| 4,478,311 | 10/1984 | Anderson | 119/96 X |

Primary Examiner—Gene Mancene
Assistant Examiner—R. Thomas Price
Attorney, Agent, or Firm—George B. Almeida

[57] ABSTRACT

A tether apparatus is secured at either end to suitable supports and thus spans one edge of a preselected area within which an animal is to be confined. The apparatus includes a folded back floating loop configuration, which floating loop translatably receives therethrough the end of the rope which is secured to the animal. The configuration allows the tether apparatus to collapse to allow the animal optimum freedom of movement while still providing the desired restraint.

20 Claims, 3 Drawing Sheets

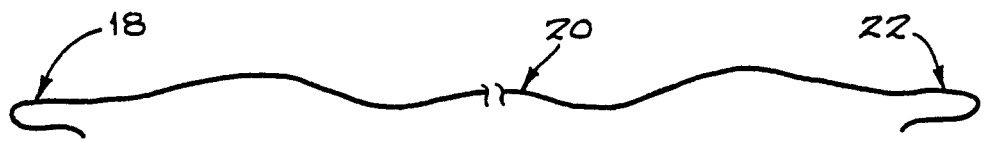
FIG_1
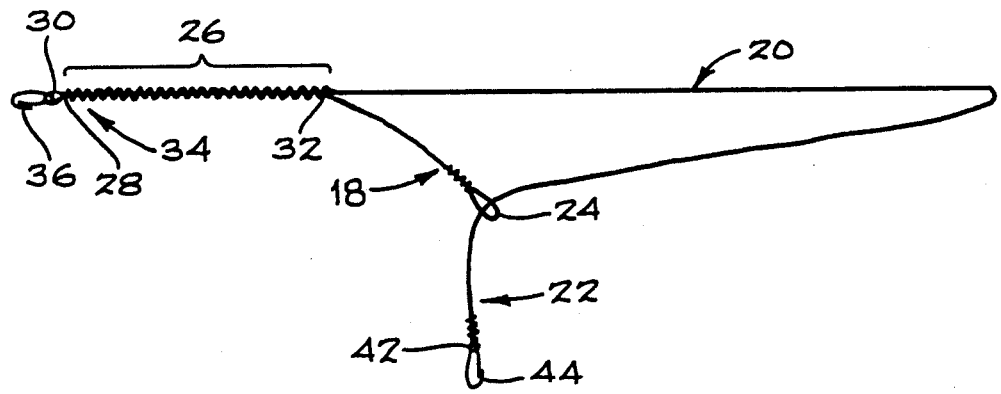
FIG_2
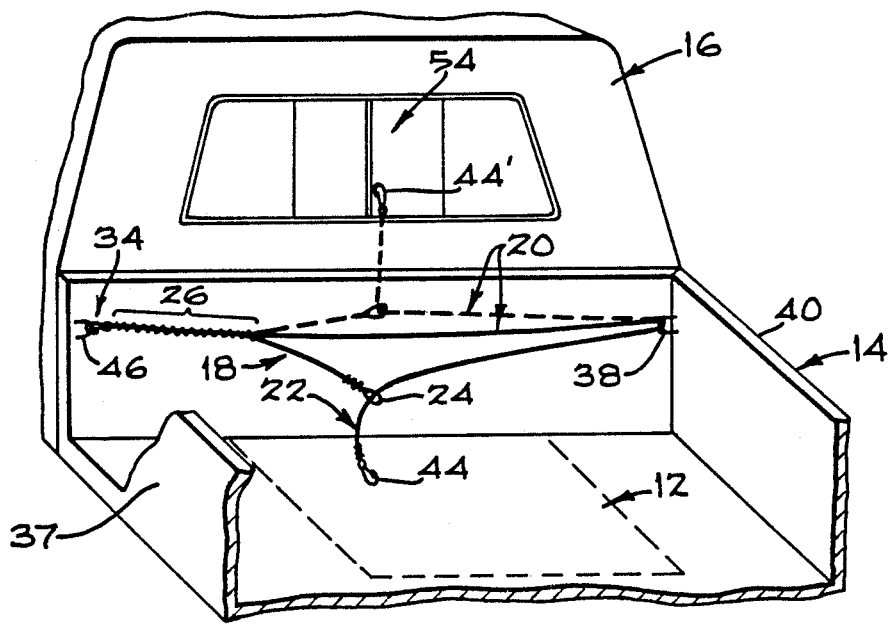
FIG_3

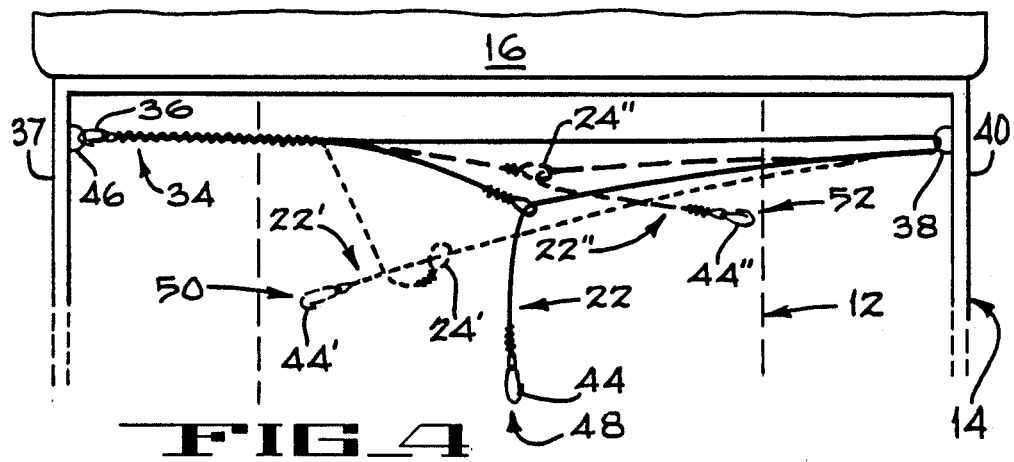
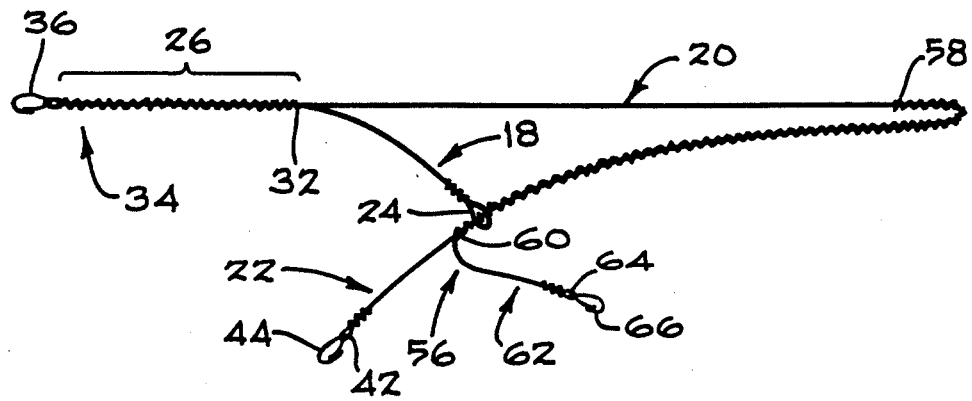
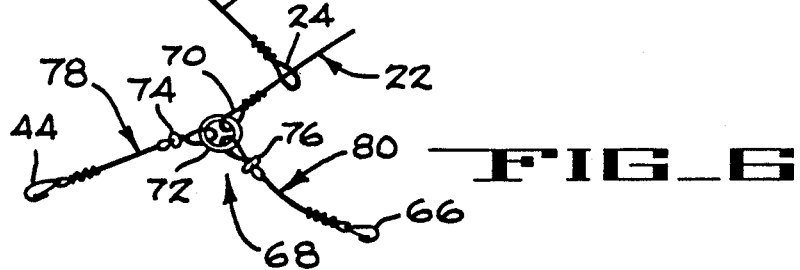
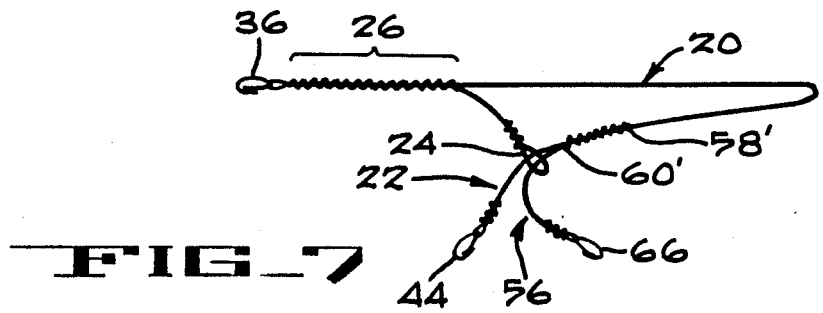

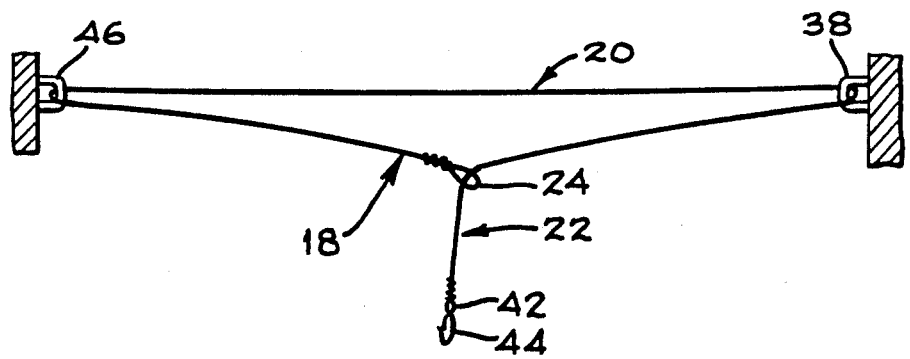
FIG_8
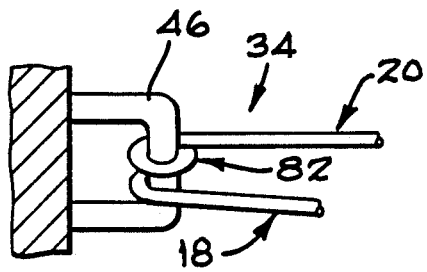
FIG_9
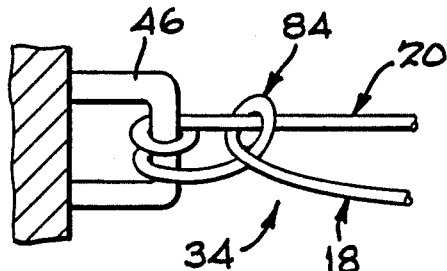
FIG_10
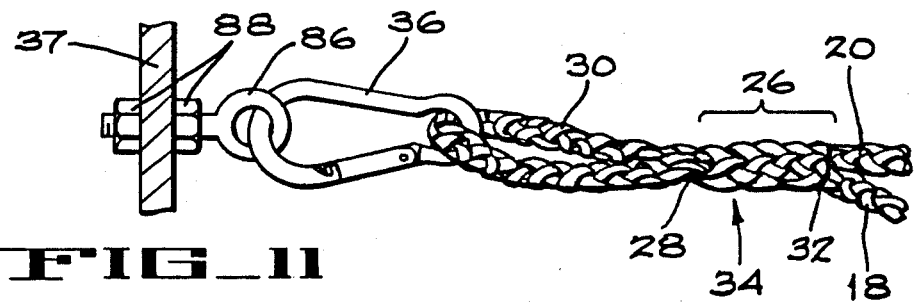
FIG_11

APPARATUS FOR RESTRAINING AN ANIMAL WITHIN A PRESELECTED AREA

BACKGROUND AND SUMMARY OF THE INVENTION

The invention relates to animal restraining apparatus and, particularly, to a tether for confining an animal, such as a dog, to a specified center region within the open box of a pickup truck, or in any other designated area, while allowing optimum freedom of movement.

For many years, animals and, in particular, pets such as dogs, have been carried in the open box of pickup trucks without any restraint or confinement, and thus were in a situation where they could readily be thrown from the truck in the event the driver made a sudden turn or move, or could jump from the truck for any of various reasons. Such a situation could cause grave injury to the animal. Some owners, concerned for the safety of their animals, have tied the animal with a rope to one of the only available tie-down hooks in their pickup, which commonly are located on either side of the box. However, although tied, the animal still could fall, or jump, from the truck on the side thereof to which the rope was tied.

Accordingly, there has been much activity in recent years by individuals and by various organizations, in behalf of improving safety conditions when transporting an animal, particularly in the back of an open pickup or other vehicle, to prevent the occurrence of such mishaps. In fact, such widespread concern has resulted in the passage of several laws at various governmental levels, prohibiting the transporting of a dog, or other animal, in the open box of a pickup truck or other similar vehicle, without some type of restraining apparatus capable of confining the animal to a specified safe area.

Various harness, leash, and/or tether apparatus have been developed which provide various levels of restraint for an animal, such as a dog, not only in the open box of a pickup truck but also on the seats of an automobile, or in other vehicles. Typical of such apparatus are tethers which provide adequate restraint and thus safety from falling for an animal in a given situation, but which may fail to supply adequate protection in other situations. Most of these apparatus which provide adequate restraint to prevent an animal from falling from, or jumping from, the vehicle, also correspondingly restrict natural movement of the animal. Thus, the animal is uncomfortably restrained or hampered, and/or may become entangled in the restraining apparatus. Conversely, other typical apparatus which allow adequate movement of the animal to allow it to be comfortable, as a rule do not provide adequate protection to prevent the animal from falling from the vehicle.

To date there is no provision, and no one has seen fit to provide, some type of restraining apparatus near the center of the open box behind a pickup truck cab, to allow securing an animal safely within a given area of the box. However, even if a tie-down of some type were available to which a dog could be tied, such a restraining configuration fails to provide the animal both flexibility of movement and safety, as mentioned above. An active animal can become tangled in the restraining rope with resulting injury. In the case of a large animal, where sufficient rope is used to allow it to stand fully erect comfortably, there is the possibility that there is sufficient length of rope to allow the animal to fall from the side of the truck.

Accordingly, it is highly desirable to provide a tethering apparatus which not only provides maximum protective restraint for the animal, but which also allows it optimal natural movement, and thus as much comfort as possible while being transported, or when confined in some other environment, while using the restraining apparatus.

To this end, the invention provides a relatively simple tether configuration which positively restrains an animal within a selected area of a movable vehicle, or within some other stationary location, while allowing maximum freedom of movement consistent with the degree of restraint required. To this end, the invention provides the advantageous configuration of a folded-back rope configuration, with an integral loop formed in a depending "floating" end of the folded-back portion of the configuration, wherein the opposite "lead" end of the rope which is attached to the animal, is first passed through the integral loop of the floating end prior to being attached to the animal. The resulting configuration allows the tether to collapse when the animal is not pulling against it, that is, is not being actively restrained, but which quickly tightens to confine the animal to the preselected area when it attempts to move, or is forced to move, to the extremes of the designated area. When the tether is in the semi-collapsed state, the animal is allowed optimum horizontal and vertical movement for lying down, standing on all four legs, or even standing on its hind legs.

In addition, the invention readily is adapted to a multiple animal tether embodiment for restraining at least two animals within the selected area.

The invention may be used to restrain an animal in an environment other than that of a movable vehicle or of a large transporting crate, that is, may be employed for restraining an animal in a kennel, or in any designated area in a private yard or a commercial animal establishment.

These and additional features and associated advantages of the invention will be apparent by consideration of the drawings and the following detailed description of the preferred embodiments.

BRIEF DESCRIPTION OF THE DRAWINGS

FIG. 1 is a pictorial view depicting a basic rope member used to form the inventive tether apparatus.

FIG. 2 is a pictorial view of an assembled tether apparatus formed from the rope member of FIG. 1, including selected fastening snaps.

FIG. 3 is a partial perspective view of a pickup truck and its open box, illustrating a preferred mounting configuration for the inventive tether apparatus of FIG. 2.

FIG. 4 is a pictorial view of the pickup box and inventive tether apparatus, illustrating the range of horizontal movement which is allowed an animal to the left, right and rear directions, within the pickup box.

FIGS. 5 and 7 are pictorial views of alternative embodiments of the invention, for restraining at least two animals.

FIG. 6 is a pictorial view of an alternative configuration for the multiple animal tethers of FIGS. 5 and 7.

FIG. 8 is a pictorial view of an alternative, simplified tether configuration.

FIGS. 9–11 are partial pictorial views of alternative configurations for the folded-over tie-down loop, for securing it to an tie-down eye bolt mounted within the pickup box.

DESCRIPTION OF THE PREFERRED EMBODIMENTS

In general, the invention provides a tether apparatus which confines movement of an attached animal to a pre-designated area (12, FIGS. 3,4) within a box 14 of a pickup truck, at the center front region immediately behind the truck cab 16, while still allowing the animal maximum safe freedom of movement. Such versatility is provided by the inventive collapsible configuration of the tether combination.

In FIG. 1, the tether is formed of an initial member such as, for example, a single length of rope having an end 18 (hereinbelow termed a "floating" end 18), a mid-portion 20 and an opposite end 22 (hereinbelow termed a "lead" end 22), and which is selectively interwoven, or spliced, to provide the preferred collapsable configuration depicted in FIG. 2. The preferred rope material is ¼" to ½" diameter, "splicing" or braided polyethelene rope but may be hemp, cotton, nylon, etc., rope, or some other type of strap, flexible wire, or suitable chain material. The latter materials preferably should be enclosed in plastic sheathing material. The manner in which the particular material is secured together along its folded-back length, or is formed into a loop in the floating end, is determined by the characteristics of the material.

Thus, the preferred material is "splicing" polyethelene rope, since the loosely braided material readily is threaded or spliced together along selected lengths of the rope to allow the application of an efficient manufacturing process. Accordingly, it is to be understood that the term "rope", and the manner depicted for splicing the rope, otherwise securing the material together, or for forming the loops, is used herein for purposes of clarity of description only, and is not intended to limit the invention to such material or methods of forming the loops or securing the material together along selected lengths thereof.

As further shown in FIG. 2, the first end 18 of the initial length of rope is folded back over the mid-portion 20 of the rope a length on the order of two or three feet, and is interwoven along a selected portion of the folded back length to define a permanently closed, integral "floating" loop 24. More particularly, the length of the folded-back portion of the end 18 is selected as approximately one-half of the width of the pickup box 14, as further discussed in FIG. 3. The folded back portion is spliced, intertwined, or otherwise integrally secured together, over a length of approximately one foot, as depicted at 26.

FIG. 11 illustrates in more detail a spliced configuration for fabricating the present tether apparatus. Since the preferred splicing rope is "hollow" along its length, the end 18 is inserted into the hollow rope at a selected point 28 consistent with the desired small size of a permanent, integral, tie-down loop 30, and is pulled therethrough to a point 32 consistent with the desired length 26. The more the end 18 is pulled within the length 26, the tighter the loop 30 becomes. Folding the rope back over the mid-portion 20 provides a newly formed tie-down end 34, having the permanently closed, tie-down loop 30. A metal, plastic, etc., snap type fastener 36 (hereinafter termed a "snap" 36) is permanently woven into, or otherwise secured within, the confines of the loop 30, to provide a first demountable snap for coupling the tie-down loop 30, and thus an end of the tether, to one side 37 of the pickup box 14 (FIG. 3).

Note that the floating end 18 and the corresponding floating loop 24 extend from the folded-over spliced portion 26 of the tether, a distance on the order of a foot or more, to provide a depending, and thus floating, end which is free to move in any horizontal and/or vertical direction relative to the mid-portion 20 as well as relative to the point 32 from which the floating loop 24 depends.

Referring also to FIG. 3, the lead end 22 and a portion of the mid-portion 20 of the rope tether is passed thru a preferably closed tie-down fastener 38 which is secured on the opposite side 40 of the pickup box 14. The lead end 22 then is loosely doubled back along the mid-portion 20, and is passed thru the floating loop 24 and extends therethrough a preselected length on the order of one or two feet. As further illustrated in FIG. 4, the lead end 22 is free to slide, that is, translate, back and forth through the floating loop 24, in response to movement of an animal. The lead end 22 is then spliced into a tight, permanently closed lead loop 42 (FIG. 2), with a second snap 44 similar to snap 36, permanently secured thereto. The snap 44 provides a second demountable fastener, which couples to a collar or harness on the animal to secure the animal to the tether apparatus. The snap 36 of the tie-down end 34 is secured to a tie-down fastener 46 on the opposite side 37 of the box 14, and thus is spaced the width of the pickup box from the tie-down fastener 38 on the side 40 (FIGS. 3, 4). As further shown in dashed line in FIG. 3, the animal has a considerable range of vertical movement extending from the lower position of the snap 44, to the higher position depicted by snap 44'.

It may be seen that the animal has considerable freedom of movement while being positively restrained to the pre-designated area 12 (FIGS. 3,4) of the pickup box. By way of illustration, the animal's range of horizontal movement also is depicted in solid, dotted and dashed lines in FIG. 4, which FIGURE illustrates the tether apparatus orientation and configuration for different positions of the dog, i.e., for the corresponding locations of the snap 44. This freedom of movement, without entanglement, is the result of the collapsable tether configuration; namely, having the loosely doubled lead end 22 slidably extending through the floating loop 24 such that when the dog moves back from the tether, end 22 tightens a little against the loop 24 and the dog is allowed movement towards the rear of the box 14, as depicted in solid line and by numeral 48. Further pulling towards the rear of the box 14 will tighten the tether configuration to a point where the dog is not allowed any further movement towards the rear of the area 12.

Given the situation where the dog pulls to the left, the floating loop 24' (and corresponding end 18') go slack, and the dog is positively restrained by the rope extending to the tie-down fastener 38 as depicted in dotted line and by numeral 50. On the other hand, when the dog pulls to the right, the lead end 22" is pulled tightly against the corresponding loop 24" to restrain the dog as depicted in dashed lines and by numeral 52. Thus, having a centrally located, floating loop 24, within which the lead end 22 can slide, allows the tether to collapse without entangling the dog when the animal is not actively being restrained, and to immediately tighten when the dog pulls in any direction, to restrain the dog to the pre-designated area 12 of the box 14 under all conditions. Such freedom-with-safety condition is not obtained by a simple, single length of rope. In addition, as depicted in FIG. 3, the tether allows optimum movement in the vertical, or up/down, direction, where an animal may readily lie down without tangling in the rope, or may stand on its hind legs with its front paws on the truck cab 16, such as when a person in the cab may wish to pet the animal through the split window 54 generally available on pickups. However, even with all this freedom of movement, the animal is positively restrained to the pre-designated area 12.

FIG. 5 illustrates an alternative embodiment of the invention, for restraining a pair of animals within a pre-designated area, in the manner of the single animal tether depicted in FIGS. 2-4. Like components are similarly numbered in the FIGURES. The tether configuration is essentially the same as that of FIG. 2, including the newly formed tie-down end 34, the spliced portion 26, the end 18 with the integral floating loop 24, and the mid-portion 20. In addition, the lead end 22 is slidably disposed through the floating loop 24 and includes the permanently closed lead loop 42 and the snap 44. However, in addition, a further length of rope 56 is spliced into the mid-portion 20 starting at a point 58 thereof prior to the tie-down 38 and continuing therein to a point 60, preferably beyond the floating loop 24 when the tether is in its most collapsed state. The rope 56 terminates in a second lead end 62 with a permanently closed tie-down loop 64 and a respective snap 66. The second snap 66 may be fastened to a second animal which then is restrained to the area 12 along with the first animal fastened to the snap 44.

As depicted in FIG. 7, the point 60' at which the rope 56 exits from the original lead end 22 may, however, be prior to the loop 24, when the tether is collapsed. Thus the alternative embodiment of FIG. 7 is similar generally to that of FIG. 5, but wherein the further length of rope 56 is spliced into the lead end 22 at point 58', and exits from the end 22 at point 60' prior to the floating loop 24 when the tether apparatus is in a semi-collapsed state. It follows that shorter common lengths of the rope 56 and of the end 22 may be spliced together than shown in FIG. 5. Thus various configurations of multiple lead end embodiments are contemplated by the invention.

FIG. 6 depicts an alternative embodiment of the dual tether apparatus of FIGS. 5 and 7, including a dual swivel fastener means 68 for minimizing any tangling of the lead ends of two animals in the event they trade positions in the pickup box, as active animals are prone to do. In this modification, the single lead end 22 of FIGS. 2-4 extends through the floating loop 24 the selected length, and is suitably secured, as by permanently closed loop 70, to a metal, plastic, etc., ring 72. A pair of swivels 74, 76 are assembled to the ring 72. A pair of short lead ends 78, 80 are spliced onto respective swivels 74, 76 and terminate in respective tight loops and the snaps 44, 66 depicted, for example, in FIG. 5. The swivels allow additional movement of a pair of animals with respect to each other without causing excessive twisting of the pair of lead ends, and thus helps in preventing excessive snarling of the tether and corresponding possible tangling of the animals.

FIGS. 8-11 illustrate several alternative configurations contemplated by the tether apparatus, wherein similar components are similarly numbered. FIG. 8 exemplifies a simplified embodiment, wherein the initial member or length of material, such as rope, includes the floating loop 24 and the lead loop 42. The floating end 18 is passed through the tie-down fastener 46, and is folded back along the mid-portion 20 a selected length. The lead end 22 is passed through the opposing tie-down fastener 38, is folded back along the mid-portion 20, and thence is passed through the floating loop 24 to define the configuration previously described in FIGS. 2-4. This embodiment has the disadvantage that it may allow the length of rope to slip relative to the tie-down 46 in the event an animal exerts greater than normal pull on the lead end 22.

FIG. 9 illustrates a configuration for lessening the possibility that the rope may slip relative to the tie-down 46 in the event that greater than normal force is exerted on the lead end 22, and consists of wrapping the floating end 18 more than once about the tie-down 46, as depicted at 82. FIG. 10 illustrates a further configuration, where the rope is wrapped one or more times and a half hitch is then made as at 84 to positively secure the newly formed tie-down end 34 to the tie-down fastener 46.

FIG. 10 illustrates an alternate embodiment of the tether apparatus of FIGS. 2-4 employing the snap 36, wherein the spliced together length 26 is of the order of inches. The resulting tie-down loop 30 secures the snap 36 to the newly formed tie-down end 34. FIG. 11 illustrates in greater detail one type of snap which may be used in the present tether apparatus, as well as illustrating more clearly the manner of splicing used therein by way of example. FIG. 11 also illustrates an alternative tie-down fastener formed of an eye-bolt 86 assembled to the side 37 via a pair of nuts 88.

Obviously a snap also may be used in the modifications of FIGS. 7-10. Also, in all the embodiments of the FIGS. 2-11, the various loops may be formed by means other than splicing; for example, glueing, pressed-on plastic fittings, etc.

Thus it may be seen that the invention contemplates various modifications to the preferred embodiment of FIGS. 2-4 exemplified herein; for example, in the splicing configurations, in the manner of securing the newly formed tie-down end 34 of the tether to a respective tie-down, in the number of lead ends and corresponding lead snaps, and in the forming of the floating end and associated floating loop through which the lead end of the tether is slidably disposed.

What is claimed is:

1. Apparatus including opposing tie-down ends for securing an animal within a preselected area via respective spaced-apart tie-down fasteners, comprising:
   a restraining member formed of a flexible material and having a first end, an opposite second end, and a mid-portion extending therebetween;
   said first end being folded back along the mid-portion to define one of said tie-down ends;
   said first end depending from a selected point along the mid-portion of the restraining member and having an integral floating loop;
   said second end being loosely folded back along the mid-portion with the second loop thereof extending through the floating loop; and
   demountable snap means selectively coupled to said second end for securing said animal thereto.

2. The apparatus of claim 1 wherein:
   said folded back first end is passed through a respective tie-down fastener, is folded back, and is selectively secured to the mid-portion at least immediately adjacent to a first respective spaced-apart tie-down fastener, with said floating loop depending therefrom to receive said second end; and said second end extends a preselected distance through, and is slidable within, the floating loop.

3. The apparatus of claim 2 wherein:
said floating loop depends from the mid-portion on the order of from one to three feet; and
said second end's preselected distance is of the order of one to two feet.

4. The apparatus of claim 2 wherein the folded back first end is spliced to the mid-portion along a length of from a few inches to two feet.

5. The apparatus of claim 2 wherein:
said folded back first end is spliced along a preselected length to define said tie-down end, with said floating loop depending from the mid-portion at a point approximately one to two feet from the tie-down end, said tie-down end being selectively coupled to said respective spaced-apart tie-down fastener; and
said second end is looped through the opposite spaced-apart tie-down fastener before slidably extending through the floating loop to attach to the animal.

6. A device including opposing tie-down ends for securing an animal within a preselected area via respective spaced-apart tie-down fasteners, comprising:
a restraining member having one of the tie-down ends permanently formed in a folded-over portion thereof, a floating loop depending from the restraining member a selected distance from the permanent tie-down end, and a mid-portion of the restraining member terminating in an opposing free lead end;
said tie-down end being selectively secured to one of the spaced-apart tie-down fasteners with the mid-portion of the restraining member being secured to the other of the tie-down fasteners;
said opposing free lead end is passed through a respective tie-down fastener, is folded back, and is extended back towards the tie-down end to pass through the floating loop; and
demountable snap means secured to the opposing free lead end for fastening the animal thereto.

7. The apparatus of claim 6 wherein the restraining member is formed of a rope-like flexible material.

8. The apparatus of claim 6 wherein the restraining member is formed of a plastic woven material.

9. The apparatus of claim 6 wherein:
the spaced-apart tie-down fasteners are secured to conventional spaced-apart sides of a pickup truck bed; and
the opposing free lead and extends a selected distance through the floating loop in slidable relation thereto, to restrain the animal to a central preselected area of the truck bed.

10. The apparatus of claim 9 wherein the selected distance is in the range of from a few inches to approximately two feet.

11. The apparatus of claim 6 wherein the tie-down end is formed by a selected spliced length of the folded-over portion of the restraining member, with the floating loop extending a preselected distance from the folded-over portion.

12. The apparatus of claim 11 wherein the preselected distance of the floating loop locates the floating loop substantially mid way between the spaced-apart tie-down fasteners.

13. The apparatus of claim 6 wherein the folded-over portion includes a spliced-together common length of the order of from a few inches to approximately two feet.

14. The apparatus of claim 6 wherein the tie-down end includes snap means for demountably securing the tie-down end to the respective tie-down fastener.

15. The apparatus of claim 6 further including:
a second free lead end integral with the restraining member and extending through the floating loop along with said opposing free lead end, for restraining a second animal within the preselected area.

16. The apparatus of claim 6 further including:
a pair of swivel means selectively secured to said free lead end; and
first and second short lead ends secured to respective swivel means for fastening to respective animals.

17. Apparatus for confining an animal between spaced-apart tie-down fasteners, comprising:
a restraining member selectively secured to span the distance between the spaced-apart tie-down fasteners;
said restraining member further including two opposing ends and a mid-portion extending therebetween;
a tie-down end folded back along the mid-portion to define a folded-over portion of one of said opposing ends and selectively secured to a first of said tie-down fasteners;
a floating loop depending from the mid-portion of the member a selected distance from the tie-down end;
the second end being loosely folded-over along the mid-portion, with the folded-over portion being secured to the second spaced-apart tie-down fastener, and with the second end being passed through the floating loop; and
means secured to the second end for demountable attachment to the animal for confinement thereof between the spaced-apart tie-down fasteners.

18. The apparatus of claim 17 wherein the second end is free to translate on the order of from one-half to two feet within the floating loop.

19. Apparatus for restraining an animal in a specified area and including a restraining member having first and second ends and a mid-portion extending therebetween, comprising:
a selected length of said first end being folded over and integrally spliced to the mid-portion along the folded-over portion of their common lengths to define a tie-down end for securing the restraining member to one side of the specified area;
said mid-portion being secured in looped configuration to the opposing side of the specified area, with said second end extending therefrom back towards the first end;
a closed floating loop formed in said first end;
said second end extending loosely from said opposing side to pass translatably through the closed floating loop in the first end; and
means secured to said second end for demountably attaching to said animal.

20. The apparatus of claim 19, wherein the specified area is within the one side and the opposing side of a truck bed, and tie-down fasteners are secured to the sides, wherein:
said tie-down end and said looped mid-portion are selectively secured to respective sides of the truck bed;
said floating loop extending a distance from the folded-over portion which locates it approximately midway between the sides; and
said second end is free to translate within the floating loop along its length.

* * * * *